United States Patent [19]

Schmitz

[11] 4,048,764
[45] Sept. 20, 1977

[54] METHOD FOR MICRO-FINISH MACHINING OF COMPOUND, CIRCULAR ARC-SHAPED PROFILED SURFACES IN ANNULAR WORKPIECES

[75] Inventor: H. Günter Schmitz, Wermelskirchen, Germany

[73] Assignee: Supfina Maschinenfabrik Hentzen KG, Remscheid, Germany

[21] Appl. No.: 666,408

[22] Filed: Mar. 12, 1976

Related U.S. Application Data

[62] Division of Ser. No. 493,467, July 31, 1974, Pat. No. 3,959,928.

[30] Foreign Application Priority Data

Aug. 6, 1973   Germany .............................. 2339726

[51] Int. Cl.² .............................................. B24B 1/00
[52] U.S. Cl. .................................................... 51/291
[58] Field of Search ............... 51/58, 165 R, 165.92, 51/165.91, 165.75, 165.76, 291

[56] References Cited

U.S. PATENT DOCUMENTS

| | | |
|---|---|---|
| 2,752,733 | 7/1956 | Peden .................. 51/165.91 X |
| 2,795,088 | 6/1957 | Schonhoft .............. 51/165.91 X |
| 3,089,289 | 5/1963 | Serafin ....................... 51/58 |
| 3,339,312 | 9/1967 | Hannon ...................... 51/58 |
| 3,503,154 | 3/1970 | Schmidt ...................... 51/58 |
| 3,741,071 | 6/1973 | Hoglund ................. 51/165.92 |

Primary Examiner—Harold D. Whitehead
Attorney, Agent, or Firm—Edwin E. Greigg

[57] ABSTRACT

Method for micro-finish machining of circular arc-shaped profiled surfaces in annular workpieces utilizing a honing tool. After an initial grinding operation the profiled surfaces of the workpieces are micro-finish machined using two machining phases. During the first machining phase the workpieces are rotated at a first predetermined rotational velocity and the honing tool is pressed against the profiled surfaces at a first predetermined pressure; while during the second machining phase the workpieces are rotated at a second predetermined rotational velocity and the honing tool is pressed against the profiled surfaces at a second predetermined pressure. Furthermore, the first predetermined rotational velocity is lower than the second predetermined rotational velocity while the first predetermined pressure is greater than the second predetermined pressure.

5 Claims, 7 Drawing Figures

METHOD FOR MICRO-FINISH MACHINING OF COMPOUND, CIRCULAR ARC-SHAPED PROFILED SURFACES IN ANNULAR WORKPIECES

This is a division of application Ser. No. 493,467, filed July 31, 1974, and now U.S. Pat. No. 3,959,928, issued June 1, 1976.

BACKGROUND OF THE INVENTION

The present invention relates to a method for the precision machining of profiled surfaces and more particularly to a method for the precision or micro-finish machining of compound circular arc-shaped profiled surfaces on annular workpieces with the aid of a honing tool which pivots about the center of one of the circular arcs of the compound profiled surface and is pressed against the profiled surface of the rotating workpiece.

Methods of this type are known. See in this regard U.S. Pat. No. 3,503,154. As is also known, the micro-finish machining according to these methods is intended to improve the surface, i.e., to reduce the depth of roughness which constitutes a measure of the surface quality. During this micro-finish machining, some material is removed from the surface.

OBJECTS, SUMMARY AND ADVANTAGES OF THE INVENTION

It is, therefore, an object of the present invention to improve the machining of profiled surfaces on annular workpieces during the process of nocro-finish machining so that the range of variation of groove diameters defined by the profiled surfaces among machined workpieces is reduced.

It is a related object of the present invention to provide a method of micro-finish machining which achieves the first stated object by rotating the workpiece and pressing the honing tool against the profiled surface to be machined in accordance with two defined micro-finish machining phases each having a rotational speed and pressure associated therewith such that the rotational speed in the first phase is lower than the rotational speed in the second phase while the pressure in the first phase is greater than the pressure in the second phase.

It is another related object of the present invention to provide in combination, an apparatus for micro-finish machining of circular arc-shaped profiled surfaces in annular workpieces, sensing means, and a timed switching relay; the combination producing circular arc-shaped profiled surfaces in annular workpieces which achieves the first stated object. The sensing means provides an indication of the diameter of the profiled surface to be machined so that the timed switching relay can be set. Then after the set time has elapsed, the relay switches the apparatus from the first micro-finish machining phase to the second micro-finish machining phase with the characteristics mentioned in the second stated object.

It is still another related object of the present invention to provide in the combination mentioned in the third stated object, a measuring instrument which indicates the position of the profiled surface to be machined relative to a defined reference plane.

These and other objects are achieved according to the present invention by the provision of:

a. apparatus comprising: a honing tool; means mounting the honing tool to pivot about the center of the circular arc of the profiled surface to be machined; means pressing the honing tool against the profiled surface to be machined; and means rotating the workpiece whose profiled surface is being machined relative to the honing tool;

b. sensing means which engages the profiled surface to be machined along a diameter located substantially at the midplane thereof and yields a parameter which corresponds to the diameter mentioned; and c. a timed switching relay comprising: means for controlling the rotating means and consequently the rotation of the workpiece whose profiled surface is being machined; further means for controlling the pressure applying means and consequently the pressure applied by the honing tool; and time responsive setting means which is set as a function of the parameter sensed by the sensing means.

And by the added provision of:

a measuring instrument which measures the distance of the diameter of the profiled surface to be machined from approximately its midplane to a reference plane which coincides with the plane containing one end face of the workpiece whose profiled surface is to be machined.

An advantage of controlling the duration of the first phase of the micro-finish machining in dependence on the measured groove diameter in the profiled surface of the workpiece is that the reduction of the groove diameter which occurs primarily in this first phase and which increases linearly with time in the region in question, is then determined by the duration of the first phase and further, that the subsequent machining in the second phase produces the desired surface quality while the amount of further material removed from the workpiece in the second phase does not substantially depend on the diameter decrease in the first phase whose magnitude depended on the duration of the first phase. In this way, the reduction of the diameter during the micro-finish machining process is so determined that the tolerance limit or the spread of the diameters of several sequentially micro-finish machined workpieces is reduced.

It is desired to use the method according to the present invention even when the location of the circular arc-shaped profiled surface within the workpiece is subject to deviations and for this purpose, an advantageous further embodiment of the present invention provides that the location of the circular arc-shaped profiled surface is measured with respect to a reference plane and the location of the pivotal axis in the working position of the honing tool is adjusted in accordance with the result of this measurement.

A further advantage results from the utilization of sensors for measuring the groove diameter in the profiled surface of the workpiece and for setting an interval in a timing switch apparatus which initiates a switch-over from the first phase to the second phase of micro-finish machining after expiration of the preset interval.

A further advantage of the present invention results because the honing tool is pressed against the profiled surface of the annular workpiece to be machined by a honing tool holder which is pivotably driven about an axis (pivotal axis) and is disposed in a slide which is slideably movable in a direction perpendicular to the pivotal axis of the holder and parallel to the axis of the workpiece; and further because of the provision of a measuring instrument which measures the location of the circular arc-shaped profiled surface within the workpiece with respect to a reference plane which sets the working location of the slide by means of a control instrument and a drive mechanism.

The measuring instrument can have many different embodiments. For example, it may be advantageously embodied in such a way that the position of the profiled surface is sensed by air nozzles, etc. Another advantageous embodiment provides that the measuring instrument is formed by two measuring edges disposed at a certain distance from one another in the axial direction of the workpiece which contact the profiled surface of the workpiece, whose one lateral face lies against a reference plane; and a measuring transducer which translates the different displacement of the measuring edges in the vertical sense with respect to the workpiece into a measurement parameter which is then fed to the control instrument.

BRIEF DESCRIPTION OF THE DRAWING

FIGS. 1a and 1 b are schematic representations of the inner and outer race of a ball bearing, respectively, machined in accordance with the method and apparatus of the present invention;

DESCRIPTION OF THE PREFERRED EMBODIMENT

Figure 1A:
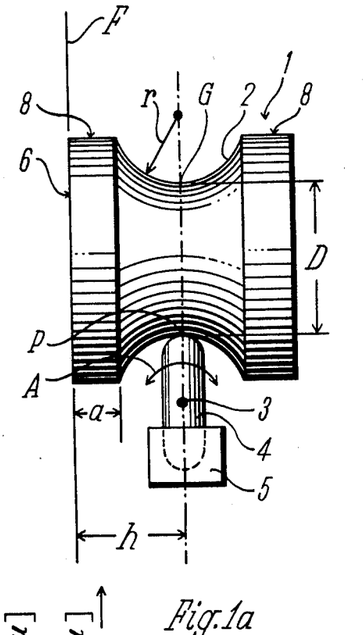
Figure 1B:
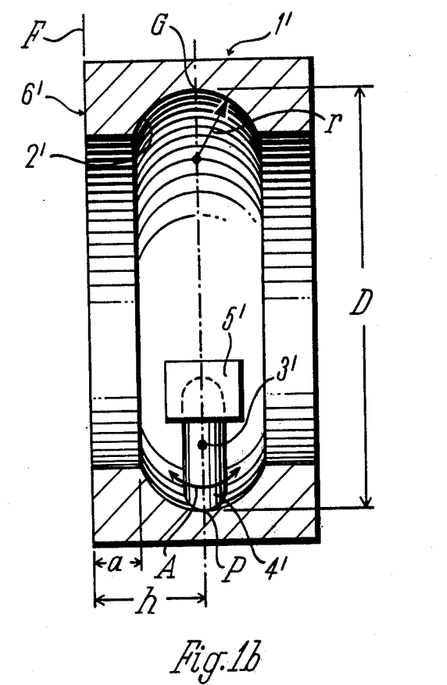

In FIG. 1a, there is shown an inner race 1 of a ball bearing and in FIG. 1b an outer race 1'. A profiled surface 2 is machined into the circumference of the race 1 and its cross-section in a plane parallel to the axis of the ball bearing race 1 is a circular arc. This profiled surface 2 forms a groove which serves as a support and guide for the balls of a ball bearing. The profiled surface 2 is machined by an initial grinding process, followed by a precision or micro-finish machining process using a honing tool 4 held in a holder 5 and pivoting about an axis 3 (pivotal axis). The honing tool 4 pivots back and forth about the pivotal axis 3 in the direction of the arrow A while the workpieces 1 or 1' are rotated about their longitudinal axis. Since the pivotal axis 3 is positioned at the center of curvature (midplane) of the circularly arcuate profiled surface 2 with a radius of curvature $r$, the tip P of the honing tool 4, which is closest to the profiled surface 2, moves along that surface during the pivotal motion. The entire pivoting device is pressed against the profiled surface 2 with a predetermined amount of force and in this way one achieves the micro-finish machining method which removes material in the radial direction leading to a smoothing of the surface, i.e., to a reduction in the roughness depth of the profiled surface 2 as well as to a certain amount of reduction of the minimum groove diameter D (FIG. 1), i.e., to a fixed and predetermined reduction ($\Delta D$) in the diameter D.

When the grooves are ground into a ball bearing inner race 1 the resulting groove diameter D is subject to deviation from one piece to another. These deviations are due, among other things, to imprecise positioning of the grinding wheels or of the workpiece during the grinding process.

Until now it has been the practice to accept these deviations in the groove diameter D during the micro-finish machining process. It has been possible only to achieve an improvement in the finish of the profiled surface 2 by producing for each workpiece the same diameter decrease $\Delta D$. Thus, the groove diameters D deviated from one another within a certain tolerance region in just the same way that they had before the micro-finish machining process and these deviations were compensated for in the final assembly of the ball bearings by using balls of different diameter corresponding to the deviations of the groove diameters D.

The same can be said about the ball bearing outer race 1' according to FIG. 1b. For this reason, FIG. 1b carries the same reference numerals for corresponding parts except that they are provided with a prime. However, in this case the micro-finish machining does not decrease the groove diameter D but rather it increases it by the material in the radial direction amounting to $\Delta D$.

It is desired to employ the micro-finish machining process not only for the improvement of the finish of the profiled surface 2 but also for a narrowing of the range of variation of the diameters D among machined workpieces. It is for this reason that the present invention begins with the following concept which is explained with the aid of FIG. 2. The solid curves marked $\Delta D$ and $R_t$ show respectively, the diametral material removal resulting in $\Delta D$ and the surface roughness depth $R_t$ as a function of time (measured in seconds) in a micro-finish machining process according to FIG. 1a or 1b, i.e., (a decrease of the diameter D in FIG. 1a and an increase of the diameter D in FIG. 1b). The roughness depth $R_t$ constitutes a measure of the surface roughness. The curves $\Delta D$ and $R_t$ result if in a first phase of the micro-finish machining process, beginning at time $t$ and lasting until time $t_{11}$, the honing tool 4 or 4' is pressed with a relatively high pressure against the workpiece 1 or 1' and a relatively low rotational speed of the workpiece 1 or 1' is employed; and if in a switchover phase, beginning at a time $t_{11}$ and terminating at a time $t_{12}$ a switchover takes place by means of which the rotational speed of the workpiece 1 or 1' is increased and the contact pressure is lowered; at which time, the rotational speed of the workpiece 1 or 1' has reached a predetermined higher value whereas the contact pressure of the honing tool 4 or 4' has a predetermined lower value; and if during a second phase from a time equal to $t_{12}$ until the time $t_E$, the micro-finish machining process utilizes these changed values of rotation and pressure. The switchover, i.e., the change of the rotational speed and of the contact pressure should be as rapid as possible, i.e., the time elapsed between $t_{11}$ and $t_{12}$ should be as short as possible. However, since the total machining time, i.e., the time from $t_A$ until $t_E$ is itself relatively short and, for example amounts to only about 6 seconds, the time differential between $t_{11}$ and $t_{12}$, required for the switchover, cannot be neglected.

In what follows, reference will be made to the following designations: the first phase of the micro-finish machining process, i.e., the micro-finish machining method which takes place with relatively high contact pressure and relatively low rotational speed of the workpiece, between $t_A$ and $t_{11}$, will be designated as "First Phase I"; and the second portion of the micro-finish machining method, occurring after the switchover, i.e., that portion lying between $t_{12}$ and $t_E$, will be designated as "Second Phase II".

Figure 2:
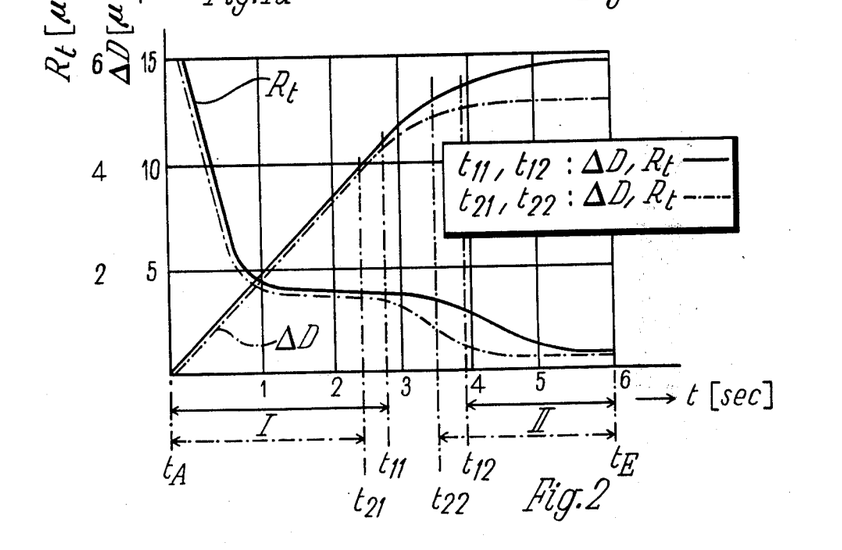
FIG. 2 is a graphic representation for the explanation of the method of operation of the present invention.

The times during which the first and second phase of the micro-finish machining method takes place are designated in FIG. 2 with solid arrows and are marked with I and II, respectively.

It has been found that during the First Phase I, the diameter change $\Delta D$ increases linearly with respect to time within a rather wide region, whereas in the Second Phase II only a relatively small diameter change $\Delta D$ takes place which, furthermore, diminishes continuously with respect to time.

At the outset, there is a very marked improvement of the surface characteristics of the profiled surface 2 due to a large decrease of the roughness depth $R_t$ as a result of the First Phase I; afterwards the roughness depth $R_t$ remains substantially constant even during a further and substantially linear increase of the diameter change $\Delta D$. A further improvement of the surface occurs due to an additional decrease of the roughness depth $R_t$ during the Second Phase II and by a predetermined amount which remains substantially constant even with increasing time.

Now, even though the same roughness depth $R_t$ will be attained after both phases are completed, it is possible to change the diameter decrement $\Delta D$ by changing the duration of the First Phase I. The change in the duration of the First Phase I must occur during a time when the diameter variation $\Delta D$ still changes substantially linearly with time, but after a time when the roughness depth $R_t$ has already fallen to a value which substantially does not change even with further machining in the First Phase I.

FIG. 2 also shows a further example in which the curves for the diameter decrement $\Delta D$ and the roughness depth $R_t$ are illustrated by broken/dotted lines. The First Phase I starts at a point in time $t_A$ and lasts until a point in time $t_{21}$, while the Second Phase II begins at a point in time $t_{22}$ and lasts until a point in time $t_E$. These time segments are also designated with I and II. The important difference between these sets of curves is in the differing duration of the First Phase I.

As will be explained further below, in the method according to the present invention, the duration of the First Phase I will be made dependent on the measurement of the groove diameter D in the profiled surface 2 of the workpiece 1. This is done so as to narrow the range of variation of the groove diameter D as they exist prior to the micro-finish machining, and this purpose is achieved as follows: The larger (according to FIG. 1a) or the smaller (according to FIG. 1b) the groove diameter D is prior to the micro-finish machining process, the longer will be the duration of the First Phase I of the micro-finish machining process and thus a correspondingly larger diameter variation $\Delta D$ is attained. Thus, the micro-finish machining process substantially reduces the range of variation of the groove diameter D. Even if it may not be possible to reduce this range of variation so completely so that only a single size ball may be used for the final assembly of the ball bearings using such races, still it is possible to reduce substantially the number of the different required sizes of balls necessary in view of the remaining spread in diameters.

Annular workpieces of the type represented in FIGS. 1a and 1b, i.e., the inner and outer races of ball bearings, exhibit variations after grinding, not only with respect to their groove diameters D, but also with respect to the location of the profiled surface 2 within the workpiece 1 itself. In other words, if the left face 6 or 6' of the workpiece lies against a reference plane F, the measurements $a$ (the width of the left shoulder of the workpiece 1) and $h$ are both subject to certain variations (the dimensions $h$ is the distance of the groove bottom G from the reference plane F; the groove bottom G is the circumferential line which, according to FIG. 1a, has the smallest or, according to FIG. 1b the largest diameter D). If it is now desired to obtain a narrowing of the variation of the groove diameter D in the profiled surface 2 by varying the duration of the First Phase I of the micro-finish machining process, even in the case when the dimensions $a$ and $h$ are also subject to dimensional deviations, then it is necessary to insure that, during the micro-finish machining process, the pivotal axis 3 or 3' about which the honing tool 4 or 4' pivots during the micro-finish machining process along the arrow A, is spaced from the reference plane F by precisely the particular distance $h$ of the workpiece being machined. Thus the apparatus which is to be described further and in detail below, provides that the position of a groove bottom G, i.e., the dimension $h$, be measured prior to the micro-finish machining process and that the device which carries the honing tool 4 or 4' is correspondingly adjusted parallel to the longitudinal axis of the workpiece.

Figure 3:
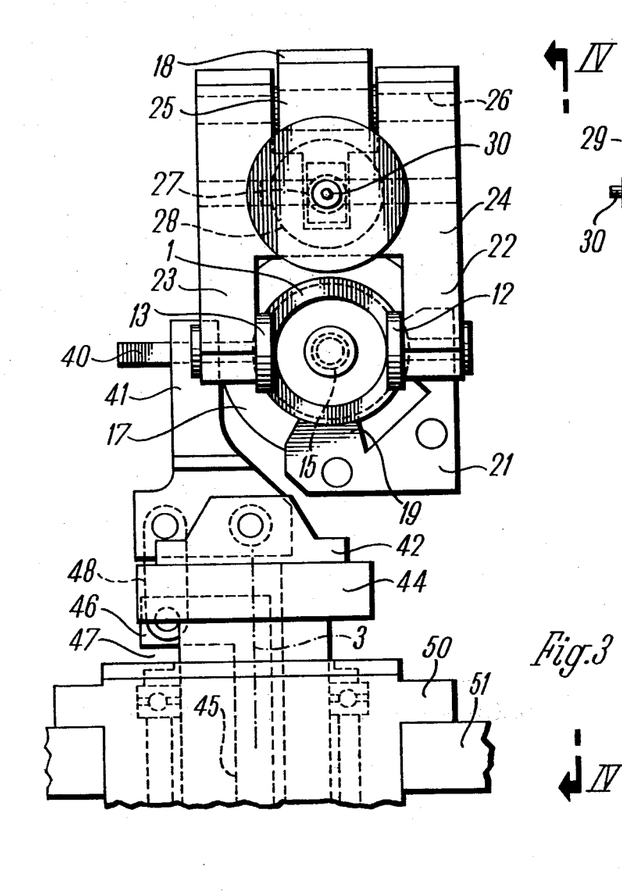
FIG. 3 is a side schematic view in elevation of a portion of an apparatus of the combination according to the present invention for micro-finish machining of profiled surfaces on annular workpieces.
Figure 4:
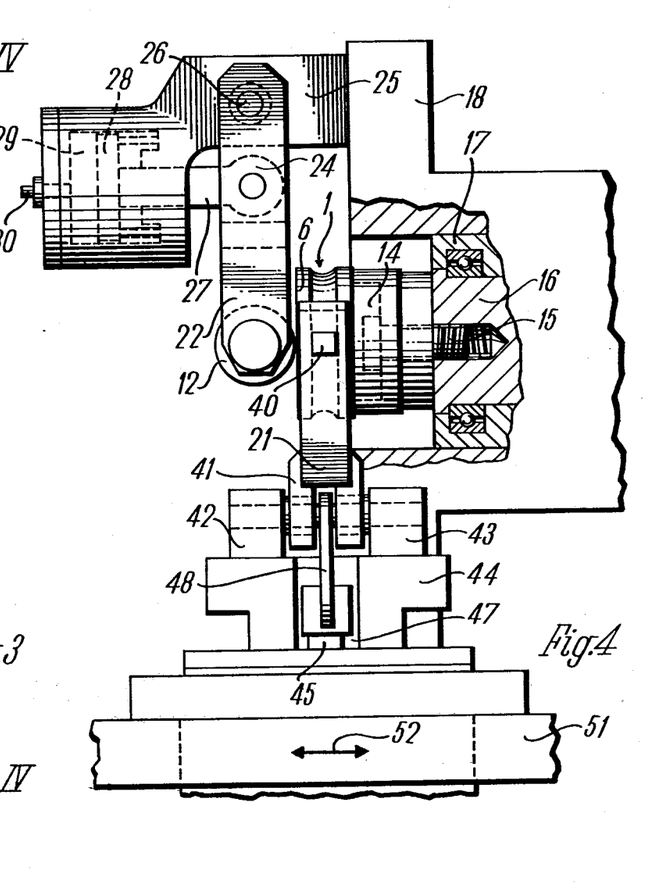
FIG. 4 is a front view of the apparatus according to FIG. 3 in the direction of the arrows IV—IV.

FIGS. 3 and 4 are schematic representations of the details of construction of an apparatus for carrying out the method; the construction partially corresponds to the apparatus disclosed in U.S. Pat. No. 3,503,154 (compare also German Pat. No. 1,577,465 issued on Jan. 14, 1971). It shows the machining of a ball bearing inner race 1. The inner race 1 is pressed against a rotatingly driven drive member 14 which functions as a motion transfer mechanism with respect to the inner race 1. The pressure is exerted by pressure rollers 12 and 13 bearing against the face 6 of the inner race 1. The drive member 14 is screwed into a shaft 16 with the aid of a threaded stud 15. The shaft 16 is rotated by drive means (not shown) and is rotatingly mounted in a slide 17 which can be slidingly displaced in a locally fixed member 18.

In the radial direction, the ball bearing inner race 1 is supported along its circumference by two sliding shoes 19 and 20 carried in a holder 21. The circular interior surfaces of the sliding shoes 19,20 bear against shoulders 8 (compare FIG. 1a) of the ball bearing inner race 1. It is desired to press the ball bearing inner race 1 driven by the drive member 14 against the two sliding shoes 19 and 20 in holder 21, and, for this purpose, the rotational axis of the drive member 14 is slightly displaced with respect to the rotational axis of the ball bearing inner race 1 and hence also with respect to the circular arc-shaped support surfaces of the sliding shoes 19 and 20, and, in this way, a secure positioning in the two sliding shoes 19 and 20 results.

The pressure rollers 12 and 13 are rotatably mounted in the ends 22 and 23 respectively of a fork-shaped holder 24. This holder 24 is pivotably mounted on an extension 25 of the member 18 by a pin 26. The holder 23 is also influenced by a similarly pivotably lever 27, fixedly connected with a piston 28. The piston 28 is disposed within a cylinder 29 and is capable of actuation, through a connecton 30, by a pressure medium. With this arrangement the pressure rollers 12 and 13 are pressed against the face 6 of the ball bearing inner race 1.

The micro-finish machining takes place with the aid of a honing tool 40 received by a honing tool holder 41. The fork-shaped lower end of the honing tool holder 41 is pivotably mounted between two blocks 42 and 43 affixed on a hollow shaft 44 which contains a control rod 45 in slidable disposition. The angled top end 46 of the control rod 45 extends through an opening 47 in the hollow shaft 44 and is made fork-shaped. Pivotably connected to the end 46 is a connection member 48 whose other end connects with the honing tool 41, also in a pivotable manner. Thus, when the hollow shaft 44 and hence the control rod 45 executes a pivotal motion about the axis of the hollow shaft 44 or of the control rod 45, then, as a consequence, the honing tool holder 41 and the honing tool 40 itself also share this pivotal motion. The axis of the hollow shaft 44 and of the control rod 45 is the same axis as the pivotal axis 3. As may be seen in FIG. 1a, when this axis is at the center of curvature of the circularly arcuate profiled surface 2 of the groove within the workpiece 1, then the desired pivotal motion of the honing tool along the profiled surface 2 is obtained.

In order to produce the required contact pressure of the honing tool 40 against the profiled surface 2 or in order to lift off the honing tool 40 from the profiled surface 2 after the termination of the micro-finish machining, the control rod 45 is slidable within the hollow shaft 44 and in the axial direction with the aid of a piston (not shown) actuatable by pressure means also not shown. By regulating the pressure of the pressure means, the contact pressure of the honing tool 40 against the profiled surface 2 can be regulated. The pivotal drive of the hollow shaft 44 is effected (in a manner not shown) with the aid of an extension attached thereto and a pivotably connected actuating crank shaft and drive means for the crank shaft connected to a drive motor via an eccentric member (compare U.S. Pat. No. 3,503,154 and German Pat. No. 1,577,456). The hollow shaft 44 and its drive means are rotatably mounted in a housing 50 disposed in a slide 51. This slide 51 is slidably movable within the frame of the apparatus (not shown) in the direction of the arrow B of FIG. 4, i.e., in a direction parallel to the rotational axis of the workpiece 1 and perpendicularly with respect to the pivotal axis 3 of the honing tool 40. The different machining positions of the slide 51 along this sliding direction during the micro-finish process correspond to the different distances h in FIG. 1a.

The setting of these machining positions is explained below in conjunction with FIG. 5. The following general comments apply to the machining process: after one complete cycle of micro-finish machining, i.e., after a Second Phase II is terminated, the honing tool 40 is lifted off of the profiled surface 2. Subsequently, the slide 51 returns from the working position shown in FIGS. 3 and 4 to its starting position (not shown). After that, a change of workpieces can occur and following that, the slide 51 is again moved forward into the working position and the honing tool 40 is again pressed against the workpiece, thus marking the beginning of the next machining cycle or its First Phase I. The working position of the slide 51 along the axis of the workpiece 1 is therefore determined by its final position into which it is advanced. This final position is defined by the position of a stop 52 (compare FIG. 5). The resetting of the stop 52 takes place between machining cycles, i.e., during the time when the slide 51 is moved back into its starting position.

The resetting of the stop 52 takes place as follows: The stop 52 is connected with a shaft 53 which penetrates a bore 54 within the slide 51. The positioning of the shaft 53, and hence of the stop 52 connected thereto, with respect to the axial direction occurs with the aid of a setting gear which can be so constructed, for example, that the end of the shaft 53 is provided with external threads 55 which mesh with the internal threads of a gear 56. The gear 56 is in turn held so that it is immovable in the relative axial position by an appropriate guide (not shown) and is turned by a worm gear 57. Thus, a rotation of the gear 56 results in a longitudinal displacement of the shaft 53 and hence also of the stop 52. The worm gear 57 is driven by a motor 58.

Figure 6:
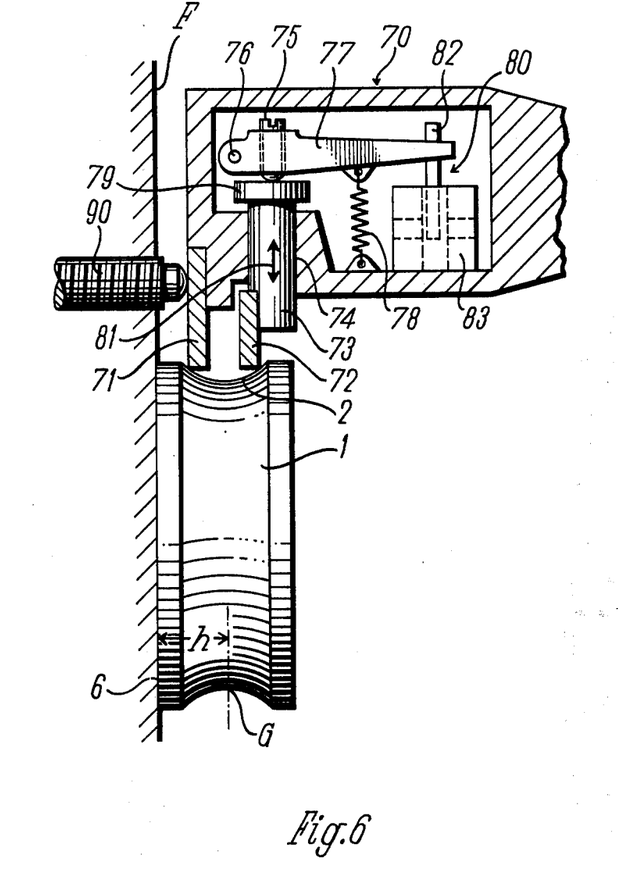
FIG. 6 is a more detailed view of a measuring instrument utilized in the apparatus shown in FIG. 5.

The location of the profiled surface 2 within the annular workpiece 1 is measured with the aid of a measuring instrument represented in FIG. 6. this measurement does not occur in the working position, but rather at a time prior to the machining operation, i.e., for example, when the workpiece 1 still resides in a supply magazine (not shown), from which the workpieces 1 are placed in the holder 21. The face 6 of the workpiece 1 is placed against a reference plane F in the measuring instrument. It is held in this position by holders (not shown), is advanced up to the measuring head 70 and is pressed against it. The measuring head 70 contains two measuring edges 71 and 72. The measuring edge 71 is fixedly attached to the measuring head 70, whereas the measuring edge 72 is connected with a sensor 73 movably disposed within the measuring head 70 and guided within a bore 74. The upper end of the sensor 73 is loaded by an adjusting screw 75, screwed into a lever 77 pivotably mounted within the measuring head 70 at a location 76. The lever 77 is engaged by the spring 78 which transmits its force through the adjusting screw 75 and the sensor 73 to the measuring edge 72 pressing it downwardly. The shoulder 79 prevents the sensor 73 from dropping through the bore 74. As seen in FIG. 6, the right end of the lever 77 is provided with an indicator 80, which can, in principle, be constructed in many different ways. The indicator produces an electrical parameter proportional to the displacement of the sensor 73 in the direction of the arrow 81. This may be done, for example, by a rod 82 consisting of magnetically conducting material which is displaced into a coil 83 thereby changing its induction which represents the measurement parameter.

If the inner race 1 of the ball bearing is pressed against the measuring head 70 sufficiently far that the measuring edge 71 rides on the profiled surface 2 and if the spring 78 then also presses the measuring edge 72, which is movably disposed within the measuring head 70, against the profiled surface 2, then the relative displacement of the movable measuring edge 72 with respect to the fixedly disposed measuring edge 71 serves as a measure of the distance h between the groove bottom G and the reference plane F . Now there exists a position in which this displacement is zero, i.e., in which no measuring parameter is produced to indicate any change. If the distance h is less than the value which corresponds to this position of the groove bottom G, then the movable measuring edge 72 lies higher than the fixed measuring edge 71. If the distance h is greater, then the movable measuring edge 72 lies deeper than the fixed measuring edge 71. The position of the measuring head 70 with respect to the reference plane F can be adjusted with the aid of an adjustment mechanism formed by a set screw 90 so that it corresponds to a position which yields a zero measured value.

Figure 5:
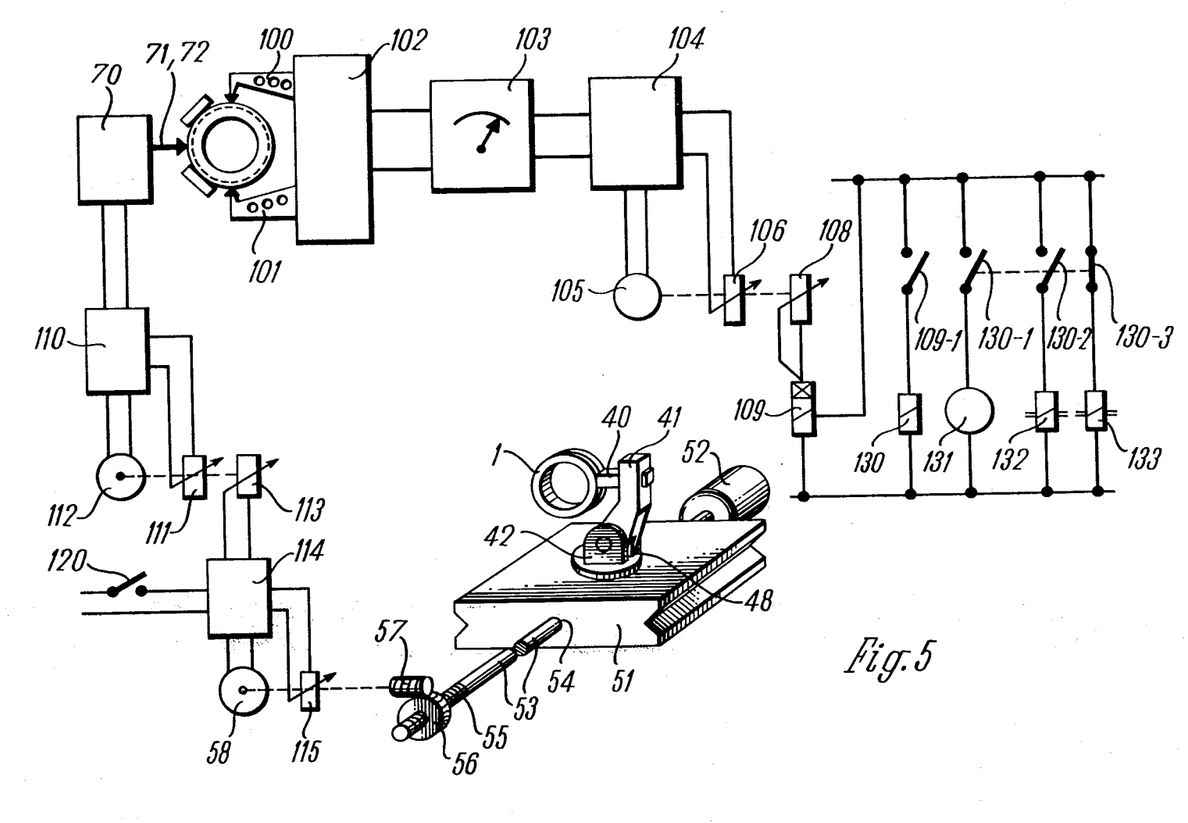
FIG. 5 is a schematic representation of a further portion of the combination according to the present invention illustrating various control elements utilized in the micro-finish machining of profiled surfaces on annular workpieces.

The apparatus for measuring the groove diameter D, as may be seen in FIG. 5, includes two sensors 100 and 101. Measuring instruments of this type are available commercially so that a more detailed embodiment need not be treated in the present context. The excursion of the sensors 100 and 101, which is proportional to the groove diameter D, is transformed within the measuring head 102 into a value that is shown on the indicator instrument 103 and is fed from the instrument 103 to a control device 104. This control device 104 contains a bridge circuit. One of the branches of this bridge circuit is the adjustable resistance 106, which is adjusted by a motor 105 until such time as the bridge circuit within the control instrument is balanced. The motor 105 also adjusts a resistance 108, whose setting determines the operating time of a timing device, for example, of a timed switching relay 109. Thus for any particular excursion of two sensors 100 and 101, i.e. for every diameter D there is correlated a particular setting of the resistances 106 and 108 and hence a definite pre-set delay time of the timed switching relay 109. This setting represents the storage of a measured value correlated with the diameter D and hence the value which determines the duration of the First Phase I of the micro-finish machining process.

The location of the profiled surface 2 within the workpiece 1, as described with the aid of FIG. 6, is sensed by the measuring head 70, whose measuring edges 71 and 72 are shown only schematically in FIG. 5. The measured value goes from the measurement signal generator 80 to a control instrument 110 containing a further bridge circuit. One component of this bridge circuit is the adjustable resistance 111, which is adjusted by a motor 112 until such time as the bridge circuit within the control instrument 110 is balanced. At the same time, the motor 112 also sets the further adjustable resistance 113 which is a component of a further bridge circuit, which, in turn, belongs to a further control instrument 114. This further bridge circuit within the control instrument 114 also includes the adjustable resistance 115, which is set by the motor 58 and can be adjusted until the measuring bridge circuit within the control instrument 114 has been balanced.

Thus, the adjustment of the adjustable resistance 111, 113, 115 corresponds to the result of the measurement of the location of the profiled surface 2 within the workpiece 1, which has been measured with the measuring edges 71 and 72, and thus constitutes the storage of this measued value.

It has already been explained that the motor 58 in its rotation simultaneously turns the worm gear 57 and thus sets the stop 52 which determines the working position of the slide 51. Thus, the stop 52 is adjusted by the motor 58 until such time as the resistance 115 has achieved the value in which the bridge circuit within the control instrument 114 is balanced, i.e., until the position of stop 52 and hence the working position of the slide 51 corresponds to the measured result as given by the measuring edges 71 and 72 and hence corresponds to the distance h between the groove bottom G and the face 6.

The current supply of the control instrument 114 takes place through a contact 120. This contact is closed by the slide 51 by switching means (not shown), whenever the slide is pulled back from its working position to its initial position. There follows the startup of the control instrument 114 and hence the energizing of the motor 58 until the resistance 115 has been adjusted to a value in which the bridge circuit within the control instrument 114, which also includes the resistance 113 is balanced.

When, after an elapsed time (pre-set delay time), which is determined by the setting of the adjustable resistance 108, the timed switching relay 109 closes contact 109-1, the relay 130 is energized, it closes the two contacts 130-1 and 130-2, and opens the contact 130-3. Closure of the contact 130-1 results in energizing a setting motor 131. This motor serves for driving a setting gear, (not shown), whose particular setting determines the rotational speed of the workpieces 1 or 1'. This rotational speed is increased while the motor 131 is running.

The relay 130 also simultaneously closes the contact 130-2 and opens the contact 130-3. This energizes the solenoid valve 132 and de-energizes the solenoid valve 133. These two solenoid valves are contained within the circuit of the presssure medium which acts upon the piston (not shown) connected with the control rod 45 (compare FIGS. 3 and 4). These valves are set differently, i.e., depending on which of the two valves 132 or 133 is open, a different pressure is exerted on this piston, and hence, as explained with respect to FIGS. 3 and 4, a different contact pressure of the honing tool 40 against the profiled surface 2 of workpiece 1 results. The response of the timed switching relay 109 thus not only increases the rotational speed, but, by turning on the setting motor 131, also causes a change, namely a diminution, of the contact pressure of the honing tool 40, by switching a pressure medium from the solenoid valve 133 to the solenoid valve 132. The setting motor 131 is so embodied that, when it reaches a particular final position, which corresponds to a previously chosen, increased rotational speed, it turns itself off.

In summary, the working process can be described as follows:

a. The slide 51 is in its working position (compare FIGS. 3 and 4); the preceding work cycle is terminated. The honing tool 40 is lifted from the workpiece. During this time, the following measurements have been made on the next workpiece:
 1. measuring the groove diameter D and appropriately adjusting the resistance 108 and hence the operating time of the timed switching relay 109 to a value corresponding to this measurement;
 2. measuring the location of the profiled surface 2 within the workpiece 1 and a corresponding adjustment of the resistance 113 to a value corresponding to this measurement.

b. The slide 51 moves back to its initial position, closing contact 120. Accordingly, the resistance 115 is adjusted by the motor 58 to a value resulting in a balancing of the bridge circuit within control instrument 114. The stop 52 is brought into a position corresponding to the measurement (2) by means of the worm gear 57 and the gear 56.

c. The workpieces are exchanged, i.e., the workpiece whose measured values correspond to the presently adjusted operating time of the time switching relay 109 and the present position of the stop 52. The workpiece is brought into the working position (compare FIGS. 3 and 4) by transport means (not shown).

d. The slide 51 is advanced until it abuts the stop 52. This position coincides with the working position. Contact 120 re-opens, thus a further setting of resistance 115 and hence of the stop 52 is no longer possible.

e. The honing tool 40 is pressed against the profiled surface 2. The pressure exerted by the contact rod 45 is determined by the solenoid valve 133.

f. The First Phase I of the micro-machining process takes place. At the start, the timed switching relay 109 and the entire circuit including the drive means for the workpiece is switched on (by a switch now shown). This phase continues until a time $t_{11}$ or $t_{21}$ (depending on the setting of the timed switching relay 109). When this relay is energized after the preset interval time, the relay 130 and the motor 131 are switched on. At the same time the solenoid valve 132 is energized and the solenoid valve 133 is de-energized. Thus, the motor for the setting gear whose adjustment determines the rotational speed of the workpiece 1 runs up toward the higher value and the rotational speed increases up to that value. After this, the motor 131 automatically turns itself off. At the same time the switchover from the solenoid valve 133 to the solenoid valve 132 takes place, so that the contact pressure drops from that determined by the setting of the solenoid valve 133 to that determined by the activation of the solenoid valve 132.

This takes place at a time $t_{12}$ or $t_{22}$. The switchover phase is thus terminated.

g. The Second Phase II of the micro-machining process takes place. It continues up to a time $t_E$. At the conclusion, the cycle is again terminated by a switch-off, the honing tool is lifted, the slide is pulled back, the stop 52 and the resistance 108 are reset corresponding to the values for the next workpiece, etc.

As may be seen in FIG. 1, the entire micro-finish machining cycle, which consists of the First Phase I and the Second Phase II as well as the intermediate switchover phase, lasts about 6 seconds in the exemplary embodiment. The duration of the First Phase I varies between 1.5 to just under 3 seconds.

The values of the rotational speed of the workpieces and the contact pressure of the honing tool can be chosen as follows:

1. First Phase I:

Rotational Speed: 3500–4500 r.p.m.
Contact pressure: 10–15 kg/cm² up to values of b 20 kg/cm²

2. Second Phase II:

Rotational speed: ca. 8000 r.p.m.
Contact pressure: 5 –10 kg/cm²

Naturally, the contact pressure depends on the type on honing tool, which, in turn, is chosen with consideration of the type and shape of the surface of the profiled surface 2; and the values given above correspond to the use of a honing tool with a cross-section of 8 by 8 mm.

What is claimed is:

1. In a method for micro-finish machining of circular arc-shaped profiled surface in annular workpieces in two phases utilizing an apparatus including: means, mounting the workpiece to the apparatus; a honing tool; means mounting the honing tool for pivotal movement about an axis, which is perpendicular to the longitudinal axis of the mounted workpiece; means for displacing the honing tool mounting means and consequently the honing tool in a direction parallel to the longitudinal axis of the mounted workpiece; means for pressing the honing tool against the profiled surface to be machined, the improvement in the method comprising the steps of:

a. engaging the workpiece prior to mounting the same to the workpiece mounting means with measuring instruments and measuring;
      aa. the location of a plane containing a point of predetermined position within the profiled surface with respect to a reference plane;
      bb. the diameter of the annular workpiece;
   b. actuating the means for displacing the honing tool mounting means after the workpiece measured in step (a) has been mounted to the workpiece mounting means for displacing the honing tool mounting means and consequently the honing tool in the parallel direction as a function of the measurement made in step (aa) so that the position of the pivotal axis defined by the honing tool mounting means corresponds to the distance of the plane containing the point of predetermined position from the reference plane;
   c. applying the honing tool to the workpiece by actuating the tool pressing means over a time period, which is determined as a function of the measurement made in step (bb) so that the reduction of the diameter of the workpiece by honing depends on the diameter measured before the honing operation in order to compensate for variations of diameter to reduce their tolerances.

2. The method as defined in claim 1, wherein the improvement further comprises the steps of:
   d. generating a signal indicative of the measurement made in step (aa) and storing the signal generated; and
   e. applying the stored signal to the means for displacing the honing tool mounting means for actuating same accordingly to step (b).

3. The method as defined in claim 2, wherein step (a) is effected for one workpiece while steps (b) and (c) are effected on another workpiece which had previously undergone step (a).

4. The method as defined in claim 2, wherein the improvement further comprises the steps of:
   f. generating a signal indicative of the measurement made in step (c) and storing the signal generated; and
   g. applying the stored signal to the means for pressing the honing tool against the profiled surface to be machined for effecting the control defined in step (c).

5. The method as defined in claim 1, wherein the machining comprise:
   i. a first phase of rotating the workpiece at a first predetermined rotational velocity while pressing the honing tool against the profiled surface being machined at a first predetermined pressure to define thereby a first micro-finish machining phase; and
   ii. subsequently a second phase of rotating the workpiece at a second predetermined rotational velocity and pressing the honing tool against the profiled surface being machined at a second predetermined pressure to define thereby a second micro-finish machining phase, with said first predetermined rotational velocity being lower than said second predetermined rotational velocity, and with said first predetermined pressure being greater than said second predetermined pressure, the improvement further comprising:
   h. controlling the duration of the first micro-finish machining phase as a function of the measurement made in step (aa).

* * * * *